United States Patent [19]

Chi

[11] Patent Number: 4,960,187

[45] Date of Patent: Oct. 2, 1990

[54] STOP WASHER FOR A BRAKE UNIT OF A BICYCLE

[76] Inventor: Yi-Chen Chi, No. 139-5, Anmei Rd., Hou Li Hsiang, Taichung Hsien, Taiwan

[21] Appl. No.: 373,827

[22] Filed: Jun. 30, 1989

[51] Int. Cl.⁵ .............................................. F16D 65/06
[52] U.S. Cl. .................................... 188/24.12; 74/526
[58] Field of Search ............ 74/526; 188/24.11, 24.12, 188/24.13, 24.19, 73.31, 210, 382

[56] References Cited

FOREIGN PATENT DOCUMENTS 24848 9/1901 Switzerland ..................... 188/24.12
496827 12/1938 United Kingdom ............. 188/24.12

Primary Examiner—Duane A. Reger
Attorney, Agent, or Firm—Fitch, Even, Tabin & Flannery

[57] ABSTRACT

A stop washer for a brake unit of a bicycle is generally a disc with a center hole. A stop is fixed on the disc and extends in a plane perpendicular to the disc. A brake unit of a conventional bicycle includes a pair of brake devices being respectively pivoted to two frame bars of a frame fork of the bicycle. The brake device includes a brake arm with a brake shoe. The brake arms are actuated by a cable. The stop washer is disposed on a pivot axle of the brake device such that the stop extends across a rotational plane of the brake arm for limiting the rotation of the brake arm.

3 Claims, 7 Drawing Sheets

STOP WASHER FOR A BRAKE UNIT OF A BICYCLE

FIELD OF THE INVENTION

The present invention relates to a stop washer, and more particularly to a stop washer for a brake unit of a bicycle.

BACKGROUND OF THE INVENTION

Referring to FIGS. 6 and 7, a pair of conventional brake devices 9 are respectively pivoted to two frame bars 84 of a frame fork 8 of a bicycle (not shown) by pivot bolts 82. A washer 99 is disposed on each pivot bolt 82. The brake device 9 is normally an L-shaped brake arm 92 with a brake shoe 94 fixed thereon. The free ends of the brake arms 92 are connected and actuated by a cable 88. When pulling the cable 88 by a brake handle (not shown), the brake arms 92 rotate about the pivot bolts 82 towards a wheel 80 such that the brake shoes 94 press the rim 81 of the wheel 80, thus accomplishing the braking purpose. However, when the cable 88 is broken, the brake arms 92 rotate outwards and tend to be suspended as shown in imaginary lines in FIG. 6 because of the gravity, such that the free ends of the brake arms 92 interfere the wheel spoke (not shown) of the wheel 80. This is very dangerous when the bicycle is moving at high speeds.

The present invention has arisen to mitigate and/or obviate the afore-described disadvantages of the brake device of the bicycle.

SUMMARY OF THE INVENTION

The primary object of the present invention is to provide a stop washer for a brake unit of a bicycle, which prevents the brake arm from interfering with the wheel spoke of the bicycle when the cable of the brake unit is broken.

The present invention seeks to provide a stop washer for a brake unit of a bicycle, which is generally a disc with a center hole. A stop is fixed on the disc and extends in a plane vertical to the disc. A brake unit of a bicycle includes a pair of brake devices being respectively pivoted to two frame bars of a frame fork of the bicycle. Each brake device includes a brake arm with a brake shoe. The brake arms are actuated by a cable. The stop washer is disposed on the pivot axle of the brake device and is arranged such that the stop extends across a rotational plane of the brake arm for limiting the rotation of the brake arm.

Further objects and advantags of the present invention will become apparent from a careful reading of the detailed description provided hereinbelow, with appropriate reference to the accompanying drawings.

DETAILED DESCRIPTION OF THE INVENTION

Figure 1:
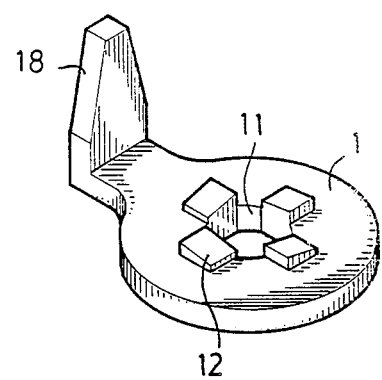
FIG. 1 is a perspective view of a stop washer for a brake unit of a bicycle in accordance with the present invention.

Referring to the drawings and initially to FIG. 1, the stop washer 1 in accordance with the present invention is generally a disc with a center hole 11. Four emerged wedges 12 are provided on the disc 1 around the center hole 11. Each wedge 12 increases in height from one end to the other end in a clockwise direction of the disc 1 as viewing from above. A stop 18 is integrally provided on the disc 1 in a plane substantially perpendicular to the disc 1 and on the same side of the wedges 12.

Figure 2:
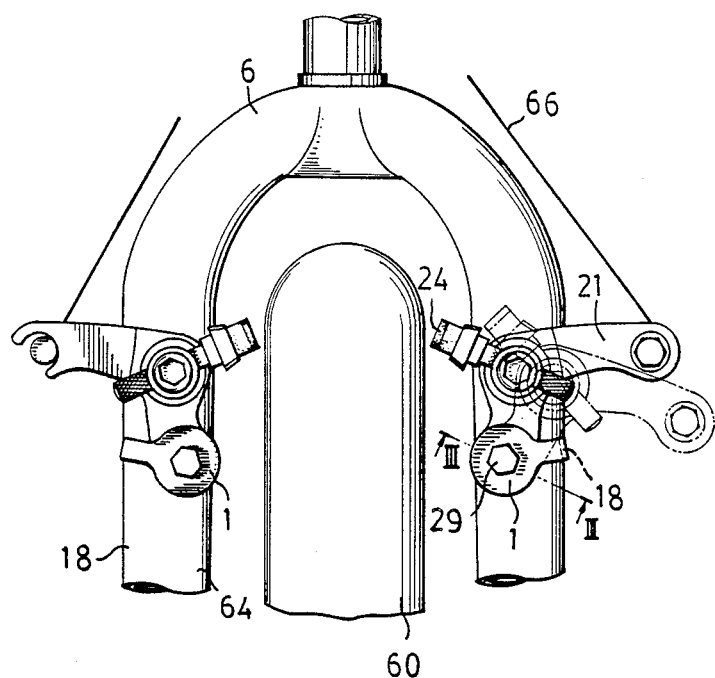
FIG. 2 is a plane view embodying the present invention.
Figure 3:
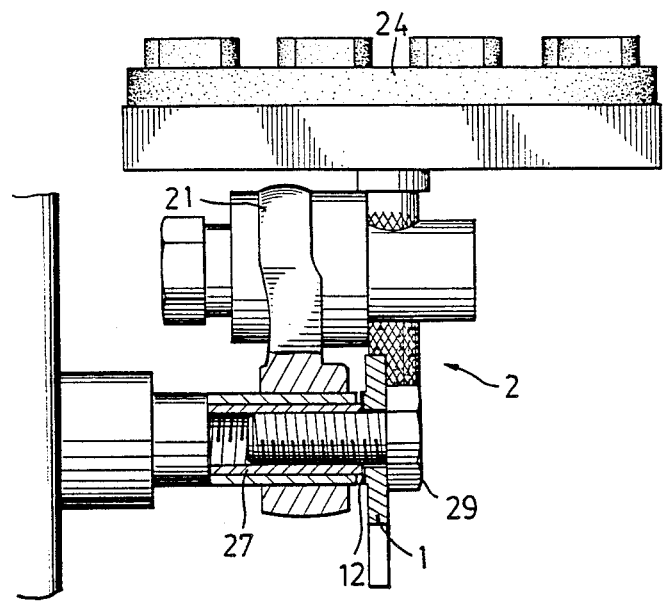
FIG. 3 is a cross-sectional view of a brake unit, taken along line III—III of FIG. 2.
Figure 4:
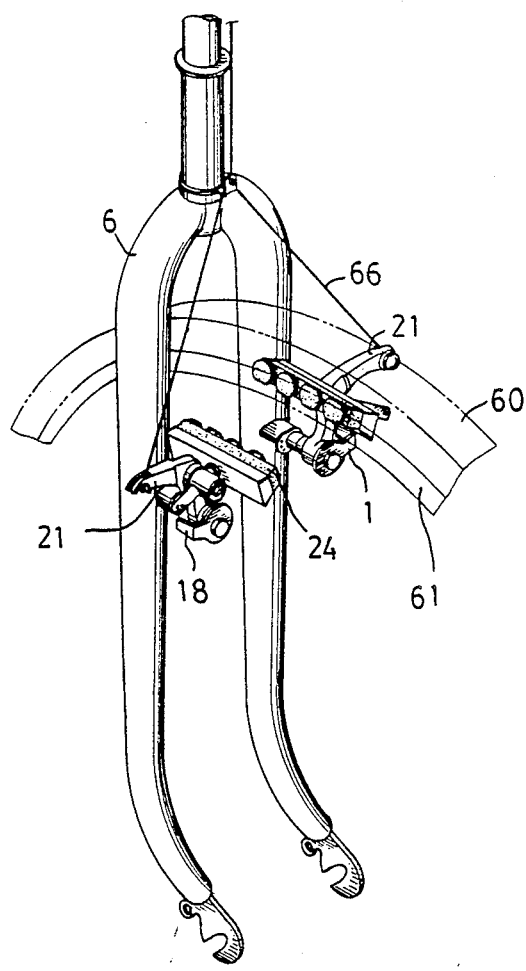
FIG. 4 is a perspective view of FIG. 2.

Referring next to FIGS. 2, 3 and 4, the brake unit in accordance with the present invention also comprises a pair of brake devices 2 being respectively pivoted to two frame bars 64 of a frame fork 6 by pivot bolts 29. The brake device 2 also includes an L-shaped brake arm 21 with a brake shoe 24 fixed thereon. The free ends of the brake arms 21 are connected and actuated by a cable 66. The disc 1 is clamped on the pivot bolt 29 with the wedges 12 bearing against a free end of a bushing 27 so as to increase a frictional force produced therebetween and to limit the rotation of the disc 1. The stop 18 of the disc 1 extends across a rotational plane of the brake arm 21 and extends in a substantially horizontal direction (FIG. 4) in order to limit the rotation of the brake arm 21. Therefore, the brake arm 21 is prevented from further rotation and held by the stop 18 of the disc 1 at a position as shown in imaginary lines in FIG. 2, when the cable 66 is broken. Thus, the brake arm 21 could not interfere the rotation of the wheel 60 any more.

Figure 5:
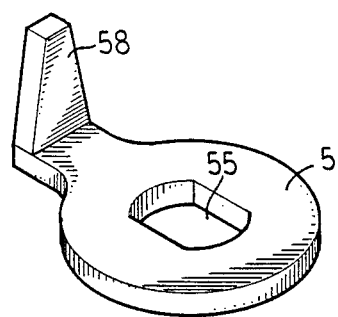
FIG. 5 is a perspective view of a stop washer according to an alternative embodiment.
Figure 6:
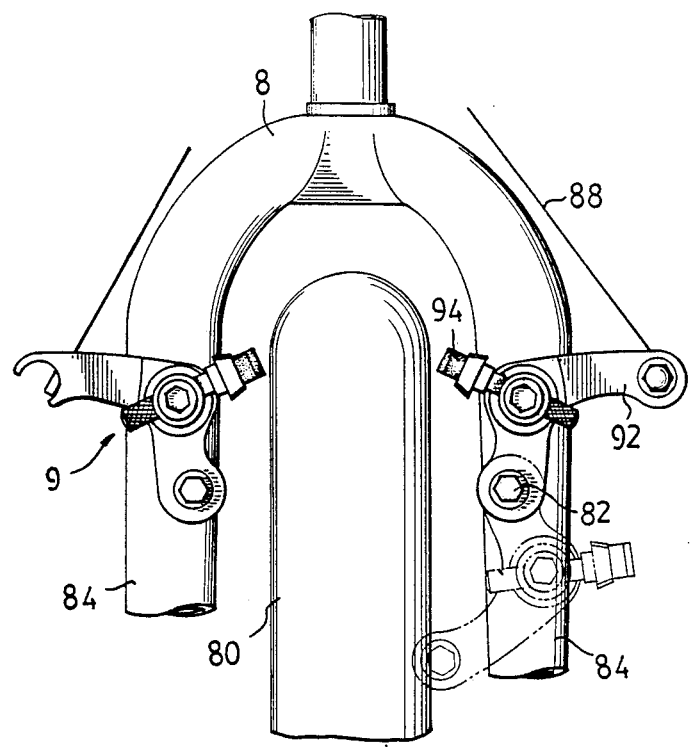
FIG. 6 is a plane view showing the working conditions of a conventional brake device.
Figure 7:
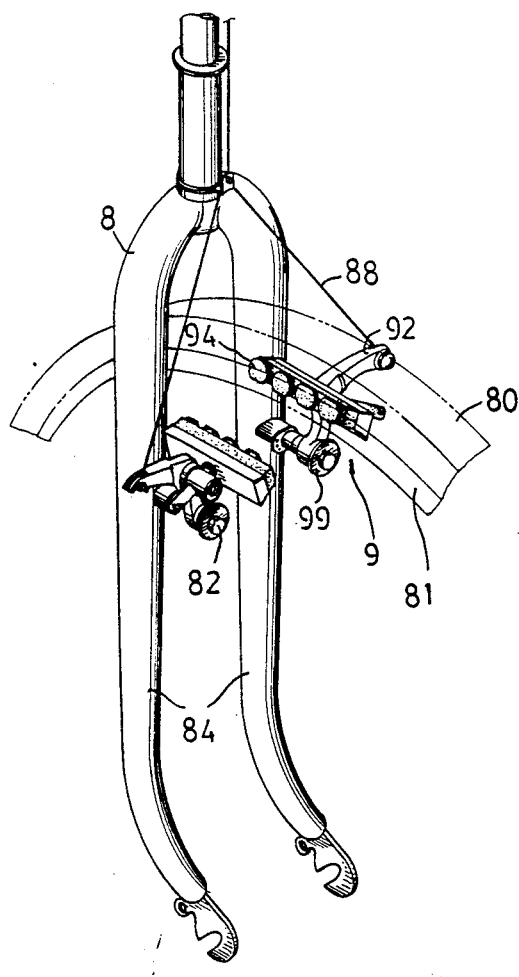
FIG. 7 is a perspective view of the conventional brake device of FIG. 6.

Referring next to FIG. 5, showing another embodiment of a stop washer in accordance with the present invention, the stop washer is generally a disc 5 with a center hole 55. The center hole 55 is substantially a cotter hole 55. A stop 58 is integrally provided on the disc 5 in a plane substantially vertical to the disc 5. The pivot bolt 29 has a portion close to the bolt head being shaped in accordance with the shape of the cotter hole 55 of the disc 5 such that a rotational movement of the stop washer 5 is prevented by the engagement of the stop washer 5 on the relative portion of the pivot bolt 29.

The stop washer 5 is clamped onto the brake device 2 by the pivot bolt 29 and is arranged such that the stop 58 of the disc 5 extends across a rotational plane of the brake arm 21 and extends in a substantially horizontal direction (FIG. 4) in order to limit the rotation of the brake arm 21.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A stop washer for a brake unit of a bicycle, said brake unit of said bicycle comprising a pair of brake devices being respectively pivoted to two frame bars of a frame fork of said bicycle, each brake device including a brake arm with a brake shoe fixed thereon, and said brake arms being actuated by a cable, said stop washer being generally a disc with a center hole formed thereon, a plurality of wedges being formed on said disc around said center hole, a stop being integrally provided on said disc extending in a plane substantially perpendicular to said disc, and said stop washer being disposed on a pivot axle of said brake device and arranged such that said stop extends across a rotational plane of said brake arm for limiting a rotational movement thereof.

2. A stop washer as set forth in claim 1, wherein each said wedge has a height increasing from one end to the other and emerges from said disc.

3. A stop washer as set forth in claim 2, wherein said height of said wedge increases clockwise.

* * * * *